(12) United States Patent
Buendia Garcia et al.

(10) Patent No.: US 9,046,094 B2
(45) Date of Patent: Jun. 2, 2015

(54) REFRIGERATOR WITH ENERGY CONSUMPTION OPTIMIZATION USING ADAPTIVE FAN DELAY

(75) Inventors: Ali R. Buendia Garcia, St. Joseph, MI (US); Alberto Regio Gomes, St. Joseph, MI (US); Tushar Kulkarni, St. Joseph, MI (US); Andrew D. Litch, St. Joseph, MI (US); Peter J. Richmond, Berrien Springs, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 351 days.

(21) Appl. No.: 13/593,545

(22) Filed: Aug. 24, 2012

(65) Prior Publication Data

US 2014/0056723 A1 Feb. 27, 2014

(51) Int. Cl.
*F25B 17/00* (2006.01)
*F25B 17/04* (2006.01)
*F04B 49/06* (2006.01)
*F25B 49/02* (2006.01)

(52) U.S. Cl.
CPC ............... *F04B 49/06* (2013.01); *F04B 49/065* (2013.01); *F25B 49/022* (2013.01)

(58) Field of Classification Search
CPC .................... F25B 2313/0293; F25B 2500/18; F25B 2500/19; F25B 2600/01; F25B 2600/112; F25B 2700/15; F25B 2700/151
USPC .............................. 62/157, 158, 180, 186, 231
See application file for complete search history.

(56) References Cited

U.S. PATENT DOCUMENTS

| | | | |
|---|---|---|---|
| 5,720,180 A | 2/1998 | Suh | |
| 5,771,701 A | 6/1998 | Suh | |
| 5,931,004 A | 8/1999 | Yoo et al. | |
| 6,286,326 B1 | 9/2001 | Kopko | |
| 6,405,548 B1 | 6/2002 | Hollenbeck | |
| 6,622,503 B1 | 9/2003 | Bennett et al. | |
| 6,668,568 B2 | 12/2003 | Holmes et al. | |
| 6,889,510 B2 * | 5/2005 | Song et al. | 62/132 |
| 6,952,930 B1 | 10/2005 | Rafalovich et al. | |
| 7,003,967 B2 | 2/2006 | Rafalovich et al. | |
| 7,090,141 B2 * | 8/2006 | Roh et al. | 236/51 |
| 7,096,682 B2 | 8/2006 | Maier et al. | |
| 7,237,395 B2 | 7/2007 | Rafalovich et al. | |
| 7,448,226 B2 | 11/2008 | Yamashita et al. | |
| 7,533,537 B2 | 5/2009 | Rafalovich et al. | |
| 2002/0144510 A1 * | 10/2002 | Park et al. | 62/186 |
| 2006/0123807 A1 * | 6/2006 | Sullivan et al. | 62/129 |
| 2008/0156028 A1 | 7/2008 | Cur et al. | |
| 2010/0161152 A1 | 6/2010 | Scrivener et al. | |

* cited by examiner

Primary Examiner — Marc Norman

(57) ABSTRACT

A method of determining a time delay for turning off an evaporator fan in a refrigerator after a compressor of the refrigerator is turned off includes operating the evaporator fan in the refrigerator for a period of time, operating the compressor of the refrigerator to cool the refrigerator to a predetermined temperature after turning off the evaporator fan, determining a power consumption value for operating the compressor to cool the refrigerator, repeating the previous steps to obtain a plurality of times and a plurality of power consumption values, selecting the time coinciding with a lowest power consumption value, and adapting the refrigerator to use the time as the time delay for turning off the evaporator fan in the refrigerator after the compressor of the refrigerator is turned off.

18 Claims, 5 Drawing Sheets

REFRIGERATOR WITH ENERGY CONSUMPTION OPTIMIZATION USING ADAPTIVE FAN DELAY

FIELD OF THE INVENTION

The present invention relates to refrigerators. More particularly, the present invention relates to refrigerators which adapt to their environments by adapting fan delay time in a manner that increases energy efficiency.

BACKGROUND OF THE INVENTION

Energy efficiency is important to the design of refrigerators. Refrigerator parameters are typically optimized for testing/certification conditions to provide the best energy consumption as determined by various energy efficiency tests. However, the refrigeration cycle is affected by the home environment conditions in such a way that the refrigerator will consume more energy due to control parameters mismatch between the testing/certification conditions and the home environment conditions. Thus, there is a parameter detuning effect. The parameters that are affected are related to the time delay between the events of turning off the compressor and turning off the evaporator fan. The fan time delay, if not optimized, can lead to a drop in efficiency in the refrigeration operation. Once the compressor is off the time delay that controls the fan will re-circulate the air in the cavities through the evaporator to use its remaining cooling capacity. At some point, the evaporator temperature will be higher than the freezer and then it will stop cooling and warming up the freezer. Later on, the compressor will have to apply more energy to reduce the aforementioned temperature delta. Thus all of this will result in additional energy cost.

Although a thermocouple could potentially be used to avoid such an effect, introduction of a thermocouple increases cost and design complexity as the sensor and wiring would need to be added.

What is needed is a method to find an optimal time delay to turn off the evaporator fan of a refrigerator.

SUMMARY

Therefore, it is a primary object, feature, or advantage of the present invention to improve over the state of the art.

It is another object, feature, or advantage of the present invention to provide a refrigerator which will adapt to its environment and enable it to run as efficiently as possible.

It is a further object, feature, or advantage to provide a method for finding an optimal time delay to turn off the evaporator fan of a refrigerator.

It is a still further object, feature, or advantage of the present invention to provide a refrigerator which operates efficiently both under the parameters typically used for testing and certification conditions as well as within home environments with varying conditions.

Another object, feature, or advantage of the present invention is to provide a refrigerator which need not use a thermocouple to determine an optimal time delay to turn off the evaporator fan of the refrigerator.

Yet another object, feature, or advantage of the present invention is to provide for tighter temperature control.

One or more of these and/or other objects, features, or advantages of the present invention will become apparent from the specification and claims that follow. No single embodiment need exhibit all of these objects, features, or advantages as it is contemplated that different embodiments may have different objects, features, or advantages.

According to one aspect, a method of determining a time delay for turning off an evaporator fan in a refrigerator after a compressor of the refrigerator is turned off includes operating the evaporator fan in the refrigerator for a period of time, operating the compressor of the refrigerator to cool the refrigerator to a predetermined temperature after turning off the evaporator fan, determining a power consumption value for operating the compressor to cool the refrigerator, and repeating these steps to obtain a plurality of times and a plurality of power consumption values. The method further includes selecting the time coinciding with a lowest power consumption value, and adapting the refrigerator to use the time as the time delay for turning off the evaporator fan in the refrigerator after the compressor of the refrigerator is turned off.

According to another aspect, a refrigerator includes a refrigerator housing, at least one compartment disposed within the refrigerator housing, a compressor, an evaporator, an evaporator fan, and a control system disposed within the refrigerator housing and operatively connected to the compressor, the evaporator, and the evaporator fan. The control system is configured to determine a time to operate the evaporator fan after turning off the compressor to assist in optimizing efficiency of the refrigerator in cooling the at least one compartment.

According to another aspect of the present invention, a method is provided for determining a time delay for turning off an evaporator fan in a refrigerator operatively connected to a smart grid after a compressor of the refrigerator is turned off using the smart grid. The method includes operating the evaporator fan in the refrigerator for a period of time, operating the compressor of the refrigerator to cool the refrigerator to a predetermined temperature after turning off the evaporator fan, and then determining a power consumption value, the power consumption value including power consumed by operating the compressor to cool the refrigerator, wherein the step of determining the power consumption value is performed using a power meter associated with the smart grid. The method further includes communicating the power consumption value to a device external to the refrigerator and storing the power consumption value and the period of time. These steps may be repeated in order to obtain a plurality of times and a plurality of power consumption values. The method further includes selecting the time coinciding with a lowest power consumption value from the plurality of times and the plurality of power consumption values. The method further includes communicating the time to the refrigerator through a power grid interface. The method further includes adapting the refrigerator to use the time as the time delay for turning off the evaporator fan in the refrigerator after the compressor of the refrigerator is turned off.

DETAILED DESCRIPTION

The present invention provides for finding an optimal time delay to turn off the evaporator fan of a refrigerator. As used herein the term "optimal time delay" is to be understood to convey that a time delay results in improved energy efficiency or energy conservation under a set of parameters or circumstances. The method includes recording the consumed power which may be determined from a smart grid wattmeter for a number of settings of the fan delay. Then a search of the resulting data may be used to determine what the optimal time delay is for energy conservation.

Figure 1:
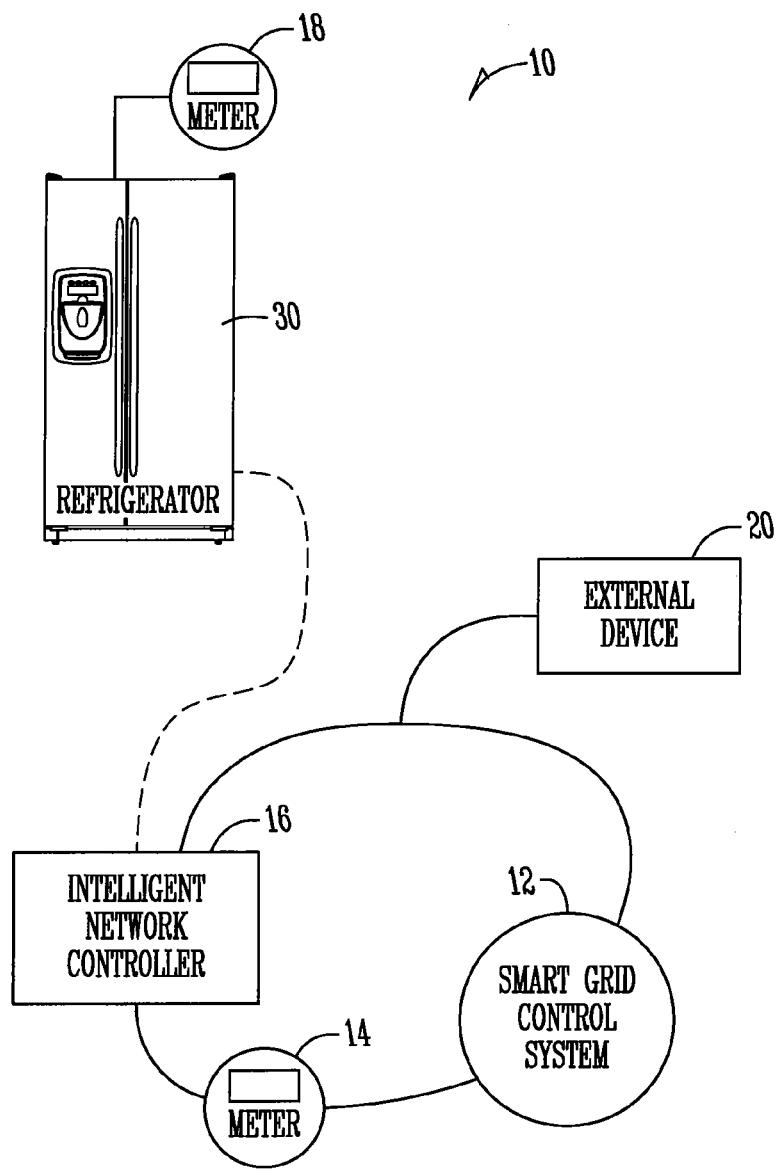
FIG. 1 illustrates one example of a system including a refrigerator.

FIG. 1 illustrates one example of a system 10. The system 10 includes a smart grid control system 12. An electric meter 14 such as the electric meter associated with a residence is operatively connected to the smart grid control system 12. An intelligent network controller 16 is operatively connected to the meter 14. The intelligent network controller 16 may also be operatively connected to the refrigerator 30. Information may be communicated to and from the refrigerator 30 through power line networking and/or wirelessly. In addition, a device 20 may be operatively connected to the smart grid control system 12. The device 20 may be used to collect and store information associated with energy usage.

In operation, a system 10 may be used to convey information from the smart grid control system 12 to the refrigerator 30. The refrigerator 30 may be connected to and access power information including from a smart grid's power meter. Alternatively, the refrigerator 30 may access a meter 18 which is connected to the refrigerator 30. The meter 18 may be present within the refrigerator or be external to the refrigerator.

Thus, consumed power information can be provided to the refrigerator in a number of different ways. The consumed power information may be provided to the refrigerator through the smart grid or through a meter associated with the refrigerator. The consumed power information may then be used by the refrigerator in determining the time delay for turning off the evaporator fan after the compressor is turned off.

Figure 2:
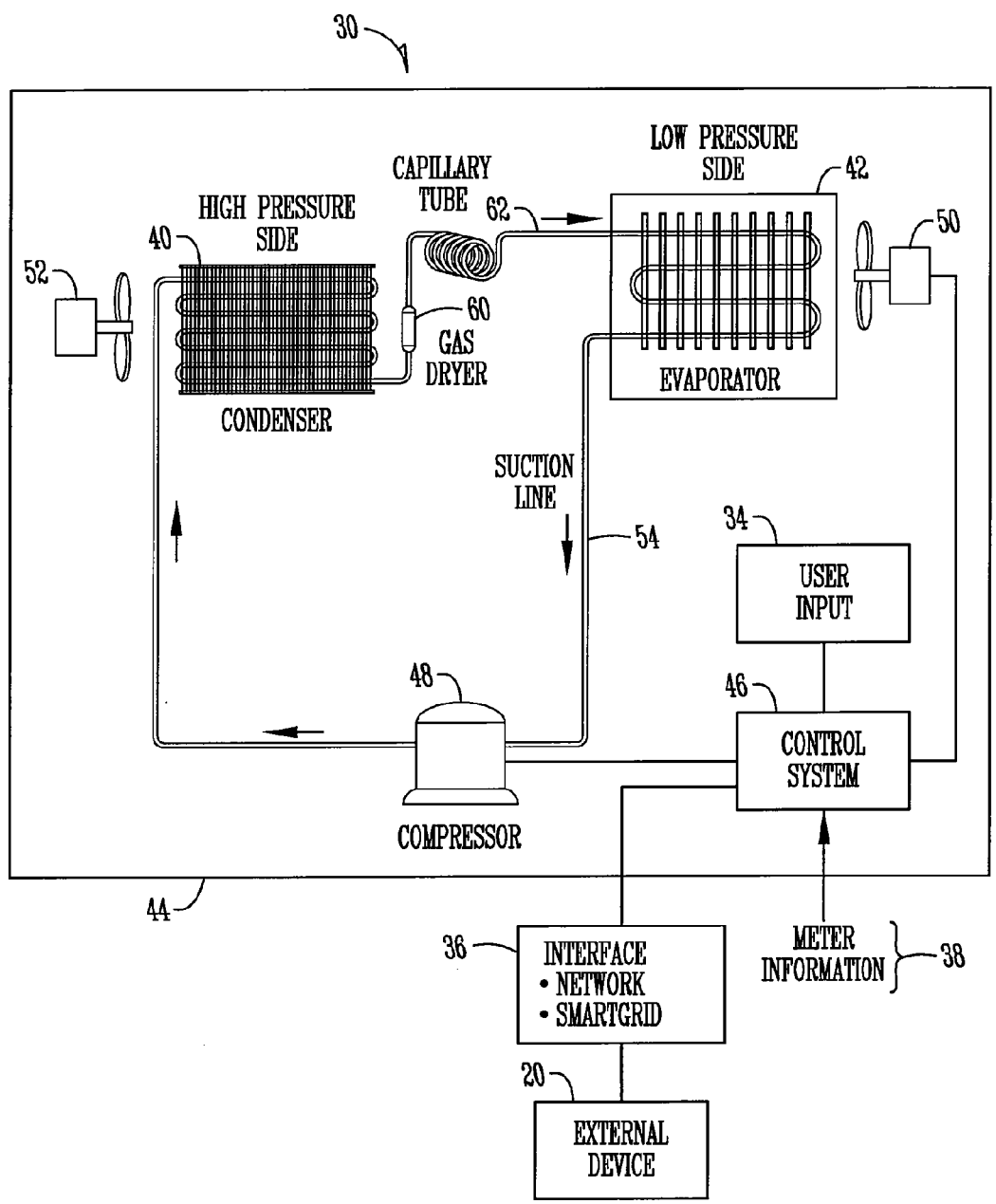
FIG. 2 illustrates one example of a refrigerator.

FIG. 2 illustrates a diagram of a cooling system of a refrigerator 30 with a refrigerator housing 44. The cooling system includes an evaporator 42, a compressor 48, and a condenser 40. An evaporator fan 50 is positioned at the evaporator and a fan 52 is positioned at the condenser. A suction line 54 is shown between the compressor 48 and evaporator 42 and a capillary tube 62 and gas dryer 60 are shown between the condenser 40 and the evaporator 42.

As shown in FIG. 2, there is a control system 46 that is operatively connected to the compressor 48 and the evaporator fan 50. The control system 46 uses meter information such as the consumed power information in determining the time delay for turning off the evaporator fan 50 after the compressor 48 is turned off. Such information may be in the form of meter information 38 which may come from a meter within the refrigerator 44, a meter within the home, or a meter associated with the smart grid. An interface 36 is also operatively connected to the control system 46. The interface 36 may be a wired interface or wireless interface which allows the control system 46 to communicate with a network or a smart grid. Thus, the interface 36 may be a network interface or a smart grid interface. An external device 20 may also be operatively connected to the interface 36 thereby allowing the refrigerator 30 to communicate with an external device 20. The external device 20 may be used to store information and/or process information.

A user input 34 is also operatively connected to the control system 46. The user input 34 may be used by a user to provide input which may be used by the control system 46 to determine the time to operate the evaporator after turning off the compressor. For example, the user input 34 may be used by a user to initiate the process of identifying the time coinciding with the lowest power consumption.

Figure 3:
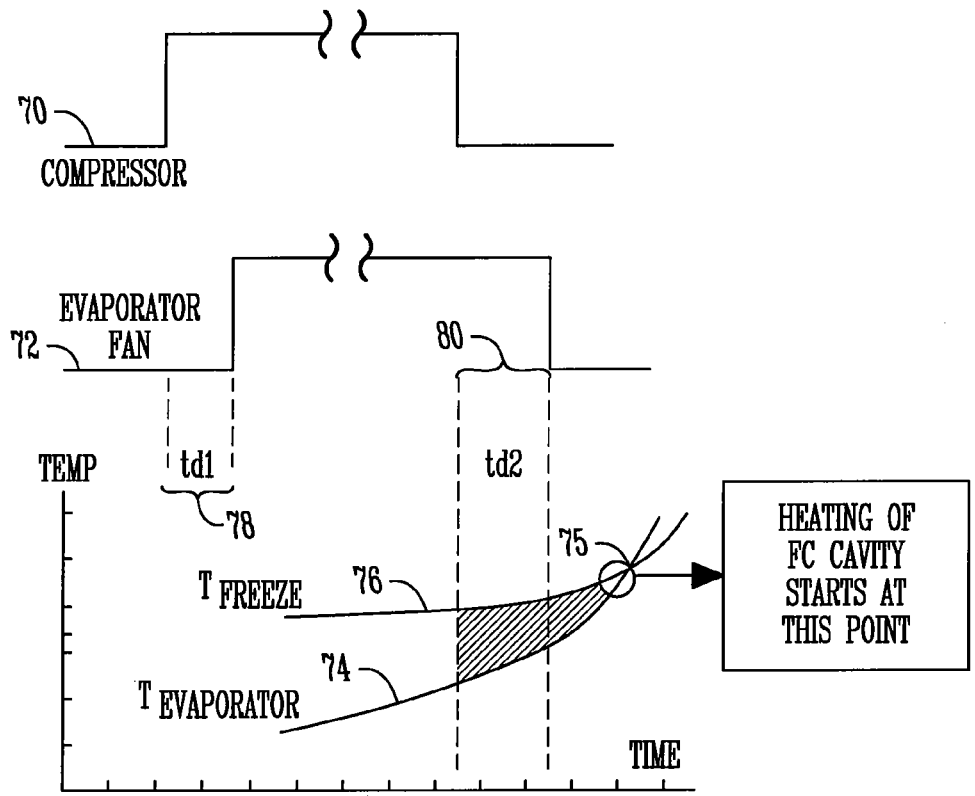
FIG. 3 is a diagram illustrating timing.

FIG. 3 illustrates a timing diagram for operation of the compressor and the evaporator fan. A first signal 70 shows operation of the compressor. A second signal 72 shows operation of the evaporator fan. There is a first time delay 78 between when the compressor turns on and when the evaporator fan turns on. There is a second time delay 80 between when the compressor turns off and when the evaporator fan turns off. A line 76 shows temperature of the freezer and line 74 shows the temperature of the evaporator. As shown in FIG. 3, once the evaporator fan is turned on, the temperature of the evaporator increases and then increases a higher rate once the compressor is turned off and at a higher rate yet once the evaporator fan is turned off. At point 75, heating of the freezer cavity starts.

Figure 4:
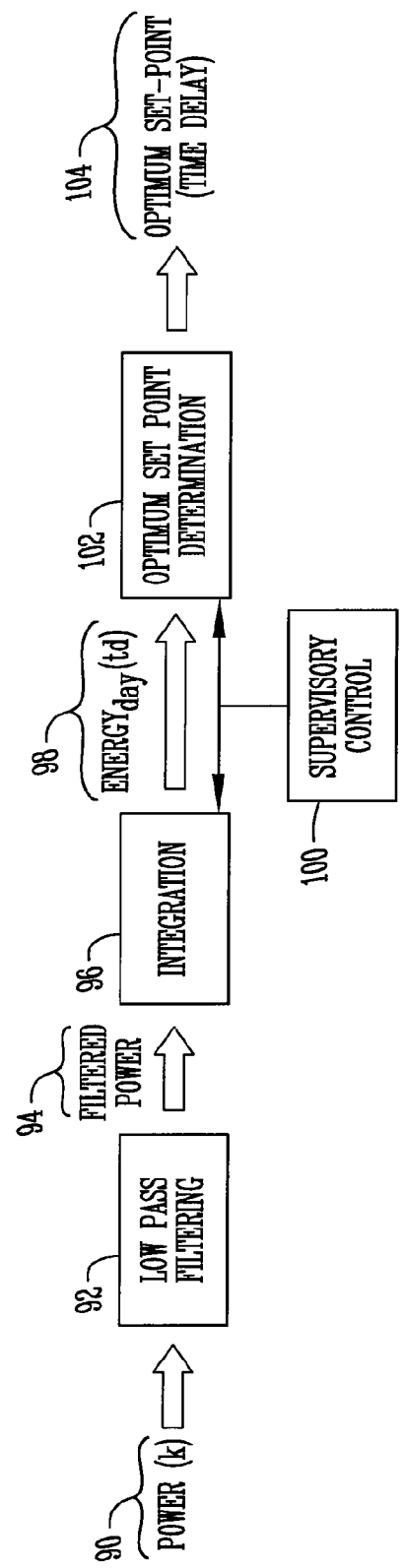
FIG. 4 is a block diagram of a method.

FIG. 4 illustrates a diagram showing an algorithm for setting time delay. Power information 90 is sent to low pass filtering 92 to provide filtered power 94. Integration 96 is then applied. This then allows a determination of energy as a function of time delay 98 to be determined. A supervisory control 100 may be used in this process. Then optimum set point determination 102 occurs resulting in an optimal set-point 104 for the time delay.

Figure 5:
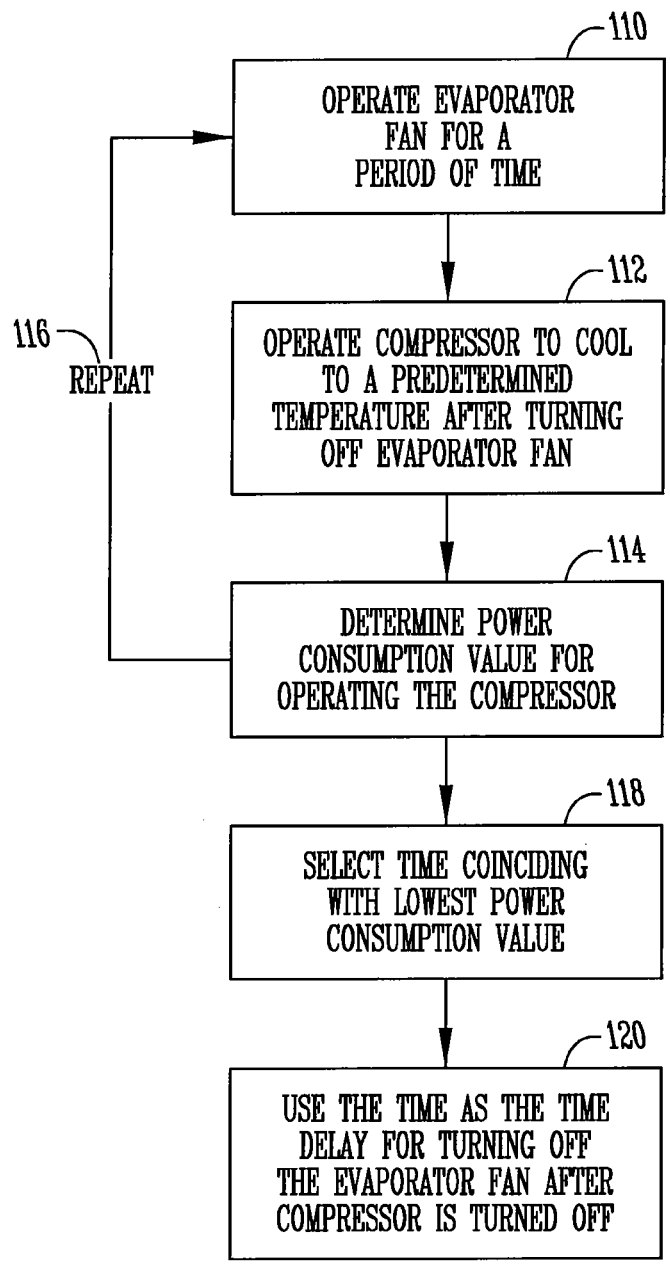
FIG. 5 is a flow chart showing a method.

FIG. 5 illustrates one example of a flow diagram. In step 110 an evaporator fan is operated for a period of time. In step 112 a compressor is operated to cool to a predetermined temperature after turning off the evaporator. In step 114 a power consumption value for operating the compressor is determined. This step may be performed by using a power meter associated with the refrigerator. The power meter may be associated with the smart grid, may be onboard the refrigerator or be external to the refrigerator. In step 116 steps 110, 112, and 114 are repeated in order to obtain a plurality of times and a plurality of consumption values. Then in step 118 a time coinciding with the lowest power consumption value is selected. In step 120 the selected time is used as the time delay for turning off the evaporator fan after the compressor is turned off. The method shown in FIG. 5 may be initiated in various ways. For example, the method may be initiated after receiving an input from a user at the refrigerator. Thus, for example, a user may use a user interface associated with the refrigerator to indicate that the method of FIG. 5 should be performed in order to set the time delay. Alternatively, the method may otherwise be performed on demand. In an alternative embodiment, the method shown in FIG. 5 may be scheduled. For example, the method may be scheduled to be performed at night to avoid disturbing the user of the refrigerator.

When collecting the power consumption values, the present invention contemplates taking into account machine state and variations which may affect power consumption values. For example, for proper comparison between power consumption values the defrost heater and the ice maker may both be off. Similarly, sources of variation should be taken into consideration or eliminated. Examples may include the amount of food within the refrigerator, the occurrence of door openings, the ambient temperature, the compressor temperature, and line voltage. Scheduling at night may reduce or eliminate some of these variations. Alternatively variations may be compensated for by the control system. In addition, when collecting the power consumption values differences associated with the time delay for the evaporation fan may be taken into account.

In addition, the present invention contemplates that the process may be performed by a control system of the refrigerator. Alternatively, information may be communicated to a device external to the refrigerator such as through a smart grid and the device may be used to store different power consumption values and select a time coinciding with a lowest power consumption value. Thus, for example, referring now to FIG. 1, an external device 18 may be used to perform calculations or store information. The external device 18 may be a computing device having a machine readable storage medium.

The above described embodiments are for illustrative purposes only and do not limit the scope of the claimed invention. The invention is only to be limited by the claims appended hereto. Therefore, other changes not mentioned explicitly are intended to be included as part of the scope of the invention. This may include the type of refrigerator configuration, the manner in which the process is performed, the order in which steps of a method may be performed, whether a power meter is internal or external to the refrigeration, variations in how the process is initiated, the manner in which sources of variation are compensated for or reduced, and other options, variations, and alternatives.

What is claimed is:

1. A method of determining a time delay for turning off an evaporator fan in a refrigerator after a compressor of the refrigerator is turned off, the method comprising:
   (a) operating the evaporator fan in the refrigerator for a period of time;
   (b) operating the compressor of the refrigerator to cool the refrigerator to a predetermined temperature after turning off the evaporator fan;
   (c) determining a power consumption value, the power consumption value including power consumed by operating the compressor to cool the refrigerator;
   (d) repeating steps (a)-(c) to obtain a plurality of times and a plurality of power consumption values;
   (e) selecting the time coinciding with a lowest power consumption value; and
   (f) adapting the refrigerator to use the time as the time delay for turning off the evaporator fan in the refrigerator after the compressor of the refrigerator is turned off.

2. The method of claim 1 further comprising receiving an input from a user at the refrigerator and performing steps (a)-(f) in response to the input.

3. The method of claim 1 further comprising scheduling performance of steps (a)-(f).

4. The method of claim 3 wherein the performance of steps (a)-(f) is scheduled at night.

5. The method of claim 1 further comprising communicating each of the plurality of times and each of the plurality of power consumption values from the refrigerator to a second device.

6. The method of claim 5 wherein the second device being a device external to the refrigerator.

7. The method of claim 5 wherein the second device being in operative communication with the refrigerator through a smart grid.

8. The method of claim 7 wherein the determining the power consumption value is performed using a power meter associated with the smart grid.

9. The method of claim 1 wherein the determining the power consumption value is performed using a power meter associated with the refrigerator.

10. The method of claim 1 wherein steps (a)-(f) are performed in alphabetical order.

11. A. refrigerator, comprising:
   a refrigerator housing;
   at least one compartment disposed within the refrigerator housing;
   a compressor;
   an evaporator;
   an evaporator fan associated with the evaporator;
   a control system disposed within the refrigerator housing and operatively connected to the compressor and the evaporator fan;
   wherein the control system is configured to determine a time to operate the evaporator fan after turning off the compressor to assist in optimizing efficiency of the refrigerator in cooling the at least one compartment;
   wherein the control system provides for (a) operating the evaporator fan in the refrigerator for a period of time; (b) operating the compressor of the refrigerator to cool the refrigerator to a predetermined temperature after turning off the evaporator fan; (c) determining a power consumption value, the power consumption value including power consumed by operating the compressor to cool the refrigerator; (d) repeating stems (a)-(c)to obtain a plurality of times and a plurality of power consumption values; (e) selecting the time coinciding with a lowest power consumption value.

12. The refrigerator of claim 11 wherein the control system being further configured to use the time coinciding with the lowest power consumption value as the time delay for turning off the evaporator fan in the refrigerator after the compressor of the refrigerator is turned off.

13. The refrigerator of claim 11 further comprising an interface for interfacing the refrigerator to an external device.

14. The refrigerator of claim 13 wherein the interface is a power grid interface.

15. The refrigerator of claim 13 wherein the interface is a network interface.

16. The refrigerator of claim 11 further comprising a user input operatively connected to the control system, and wherein the control system is adapted to determine the time to operate the evaporator after turning off the compressor in response to input received through the user input.

17. The refrigerator of claim 11 further comprising a power meter operatively connected to the control system.

18. A method of determining a time delay for turning off an evaporator fan in a refrigerator operatively connected to a smart grid after a compressor of the refrigerator is turned off using the smart grid, the method comprising:
   (a) operating the evaporator fan in the refrigerator for a period of time;
   (b) operating the compressor of the refrigerator to cool the refrigerator to a predetermined temperature after turning off the evaporator fan;
   (c) determining a power consumption value, the power consumption value including power consumed by operating the compressor to cool the refrigerator, wherein the step of determining the power consumption value is performed using a power meter associated with the smart grid;
   (d) communicating the power consumption value to a device external to the refrigerator and storing the power consumption value and the period of time;
   (e) repeating steps (a)-(d) to obtain a plurality of times and a plurality of power consumption values;
   (f) selecting the time coinciding with a lowest power consumption value from the plurality of times and the plurality of power consumption values;
   (g) communicating the time to the refrigerator through a power grid interface; and
   (h) adapting the refrigerator to use the time as the time delay for turning off the evaporator fan in the refrigerator after the compressor of the refrigerator is turned off.

* * * * *